US012810333B2

(12) United States Patent
Wu et al.

(10) Patent No.: US 12,810,333 B2
(45) Date of Patent: Nov. 24, 2026

(54) MULTI-STEP LANGUAGE MODEL ENSEMBLE METHOD, NON-TRANSITORY COMPUTER-READABLE STORAGE MEDIUM, AND SYSTEM FOR ITEM ATTRIBUTE EXTRACTION

(71) Applicant: Maplebear Inc., San Francisco, CA (US)

(72) Inventors: Aomin Wu, Scarsdale, NY (US); Paul Harrison Baranowski, Waxhaw, NC (US)

(73) Assignee: Maplebear Inc., San Francisco, CA (US)

( * ) Notice: Subject to any disclaimer, the term of this patent is extended or adjusted under 35 U.S.C. 154(b) by 153 days.

(21) Appl. No.: 18/760,578

(22) Filed: Jul. 1, 2024

(65) Prior Publication Data

US 2026/0004336 A1 Jan. 1, 2026

(51) Int. Cl.
*G06Q 30/00* (2023.01)
*G06Q 30/0601* (2023.01)

(52) U.S. Cl.
CPC ..... *G06Q 30/0603* (2013.01); *G06Q 30/0627* (2013.01)

(58) Field of Classification Search
CPC ........... G06Q 30/0627; G06Q 30/0629; G06Q 30/0603; G06Q 30/06031; G06Q 30/06032; G06Q 30/0601–0645
See application file for complete search history.

(56) References Cited

U.S. PATENT DOCUMENTS

2021/0241076 A1* 8/2021 Pan ........................ G06N 3/043
2022/0163455 A1* 5/2022 Pollak ................. G06F 18/2413
2023/0186364 A1* 6/2023 Stiegler .............. G06Q 30/0627 705/26.63
2025/0053922 A1* 2/2025 Al-Yami ............ G06Q 30/0603
2025/0390894 A1* 12/2025 Subramanian ....... G06Q 30/018

OTHER PUBLICATIONS

P. Das, Y. Xia, A. Levine, G. Di Fabbrizio and A. Datta, "Large-scale taxonomy categorization for noisy product listings," 2016 IEEE International Conference on Big Data (Big Data), Washington, DC, USA, 2016, pp. 3885-3894, doi: 10.1109/BigData.2016.7841063. (Year: 2016).*

P. Geadas, A. Alves and B. Ribeiro, "Ensemble learning for keyword extraction from event descriptions," 2014 International Joint Conference on Neural Networks (IJCNN), Beijing, China, 2014, pp. 2669-2676, doi: 10.1109/IJCNN.2014.6889911. (Year: 2014).*

* cited by examiner

*Primary Examiner* — Jeffrey A. Smith
*Assistant Examiner* — Kennedy Gibson-Wynn
(74) *Attorney, Agent, or Firm* — Fenwick & West LLP

(57) ABSTRACT

An online system automatically identifies item attributes of an item. The online system prompts a set of outputs from a set of multi-modal large language models with an image of the product and a request to determine if the details of size information is present in the image. The online system receives a set of outputs, wherein an output describes whether the size information is present in the image. The system then prompts the set of language models with a request to extract the value of the size information in the image. Responsive to determining that a threshold number of outputs have matching values of size information that is present in the image, the system updates the item attribute data with the matching values of size information of the product.

19 Claims, 5 Drawing Sheets

MULTI-STEP LANGUAGE MODEL ENSEMBLE METHOD, NON-TRANSITORY COMPUTER-READABLE STORAGE MEDIUM, AND SYSTEM FOR ITEM ATTRIBUTE EXTRACTION

BACKGROUND

An online system identifies item attributes for an item. Current systems extract product attributes of an item and store the extracted attributes in association with the item when cataloging items. The attribute information in the catalog may be used downstream to present information about the products to users, and the like. Current systems, however, are prone to inaccurately identify and catalog item attributes for an item when extracting information.

SUMMARY

An online system automatically identifies item attributes of an item. The online system prompts a set of outputs from a set of multi-modal large language models with a first set of prompts. The first set of prompts includes an image of the item and a request to determine if the details of size or count information is present in the image. Size information refers to a quantification of the weight, or the volume weight of the item. Count information refers to a quantity of a number of units in the item. The online system receives a set of outputs from the set of multi-modal large language models, wherein an output describes whether a respective multi-modal language model determined that the size or count information is present in the image. Responsive to determining that a threshold number of outputs indicate that the size or count information is present in the image, the online system prompts the set of multi-modal machine-learned models with a second set of prompts. The second set of prompts includes the image of the item and a request to extract the value of the size or count information in the image. The online system receives a set of outputs from the multi-modal models comprising of a second set of outputs with extracted values of size or count information of the item in the image. Responsive to determining that a threshold number of outputs have matching values of size or count information that is present in the image, the online system updates the item attribute data with the matching values of size information of the item.

DETAILED DESCRIPTION

Figure 1A:
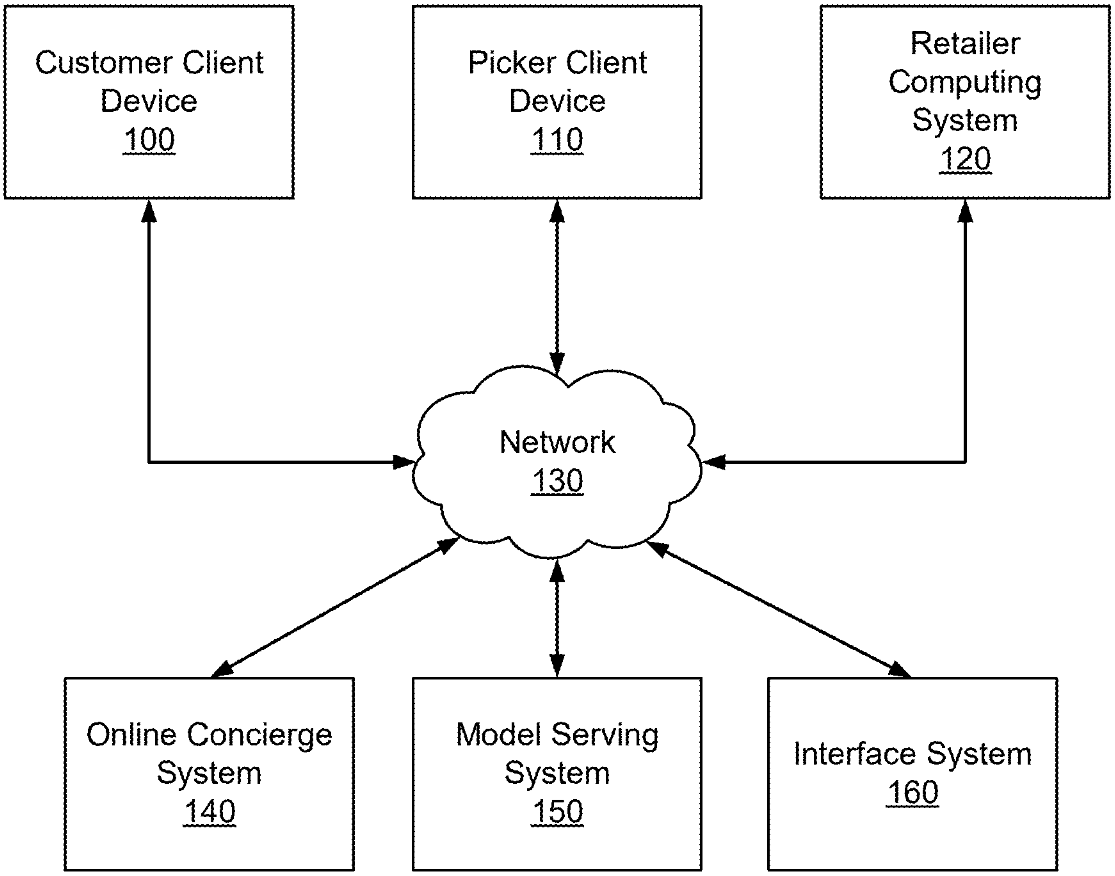
FIG. 1A illustrates an example system environment for an online system, in accordance with one or more embodiments.

FIG. 1A illustrates an example system environment for an online system 140, in accordance with one or more embodiments.

The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1A, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140.

In one or more embodiments, the online system 140 performs attribute extraction from one or more item descriptions to extract values for attributes using an ensemble method of multiple machine-learned models. In one or more embodiments, an item description is a photo of the item, a text description of the item (e.g., provided by the manufacturer or retailer selling the item), and the like. As defined herein, attributes of an item are properties or features of the item. In one or more embodiments, an attribute referred to in the remainder of the specification is a size measurement and/or a count measurement of an item. However, it is appreciated that the attribute may refer to any other characteristic of an item in other embodiments. An ensemble includes a technique where multiple models are combined to improve the overall performance of a predictive model. Each model in the ensemble may be trained differently and thus may be of varying architectures, parameters, sizes, and capabilities.

Specifically, the online system 140 obtains an image of an item from a database. The online system 140 then prompts a set of multi-modal large language models, an ensemble, with a first set of prompts. The first set of prompts include an image of the item and a request to determine if the details of size information is present in the image. The online system 140 receives a set of outputs from the set of multi-modal large language models. The set of outputs describe whether a model of the ensemble determines that the size or count information is present in the image. Responsive to determining that a threshold number of outputs indicate that the size or count information is present in the image, the online system 140 prompts the ensemble with a second set of prompts. The second set of prompts include the image of the item and a request to extract the value of the size information in the image. The online system 140 receives a second set of outputs from ensemble. The output describes the extracted values of size or count information of the item in the image. The online system 140 determines the matching values of size or count information between the extracted values. Responsive to determining that a threshold number of outputs have matching values of the extracted values, the online system 140 updates the item attribute data with the matching values of size or count information attributes.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one or more embodiments, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 160 and synthesizes a response to the query on the external data. While the online system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
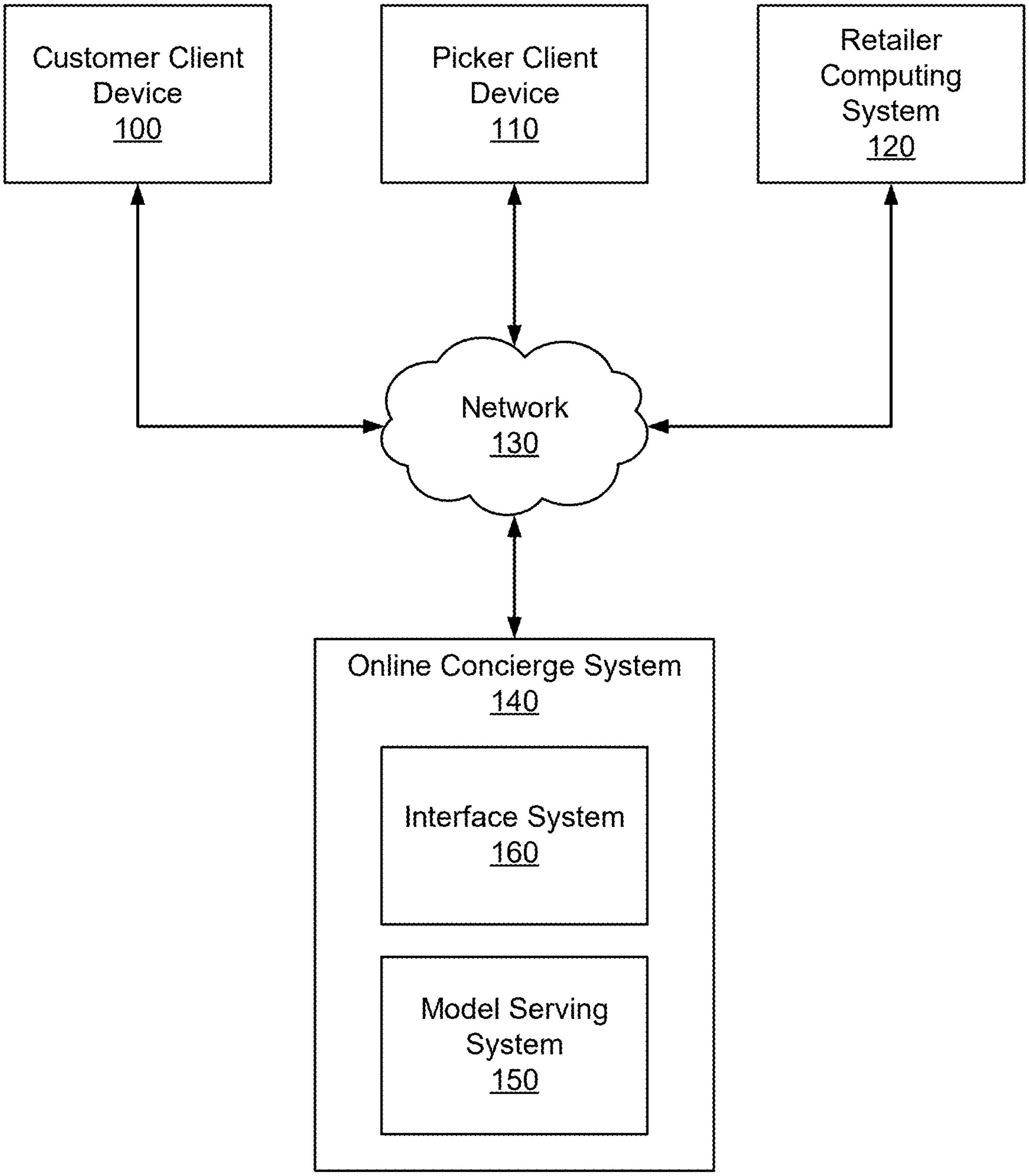
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140.

Figure 2:
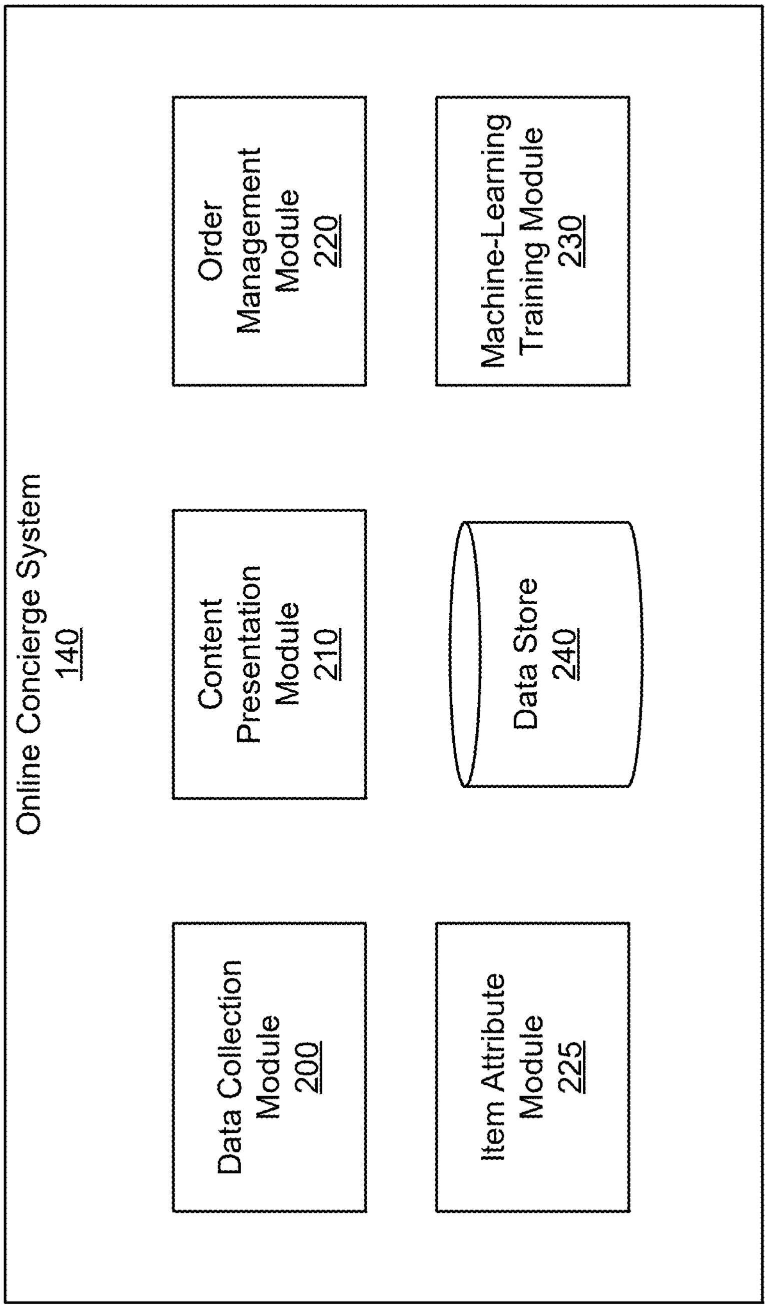
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The attribute extraction module 225 extracts the attribute values for items from item descriptions through an ensemble method of machine-learned models for extracting item attributes. In one or more embodiments, an attribute is a size measurement or count of units in an item. Data quality is an issue for cataloging items in a taxonomy, particularly for taxonomizing items with size measurements. In one or more embodiments, an extraction method may use detection models for extracting attributes for an item. However, these methods often have difficulty distinguishing between accurate and inaccurate extractions for predicting the attributes of an item. By employing the ensemble of machine-learned models to extract attributes, the attribute extraction module 225 efficiently and accurately determines the size measurement or pack counts that match the item images. The attribute extraction module 225 is able to make more confident predictions of the attribute data which allows for automated auditing of attributes of an item.

An ensemble of machine-learned models combines multiple models to improve the overall performance and accuracy of extraction. Specifically, rather than relying on a single model, ensemble methods leverage the diversity of multiple models to make more accurate predictions or classifications.

In one or more embodiments, the attribute extraction module 225 employs a 2-step verification process. The 2-step verification further prevents hallucination between language learning models. By verifying the attributes of an item through multiple machine-learned models, the attribute extraction module 225 prevents hallucinations between models, addresses errors within models quicker, and provides more accurate and precise attributes of the item.

Figure 3:
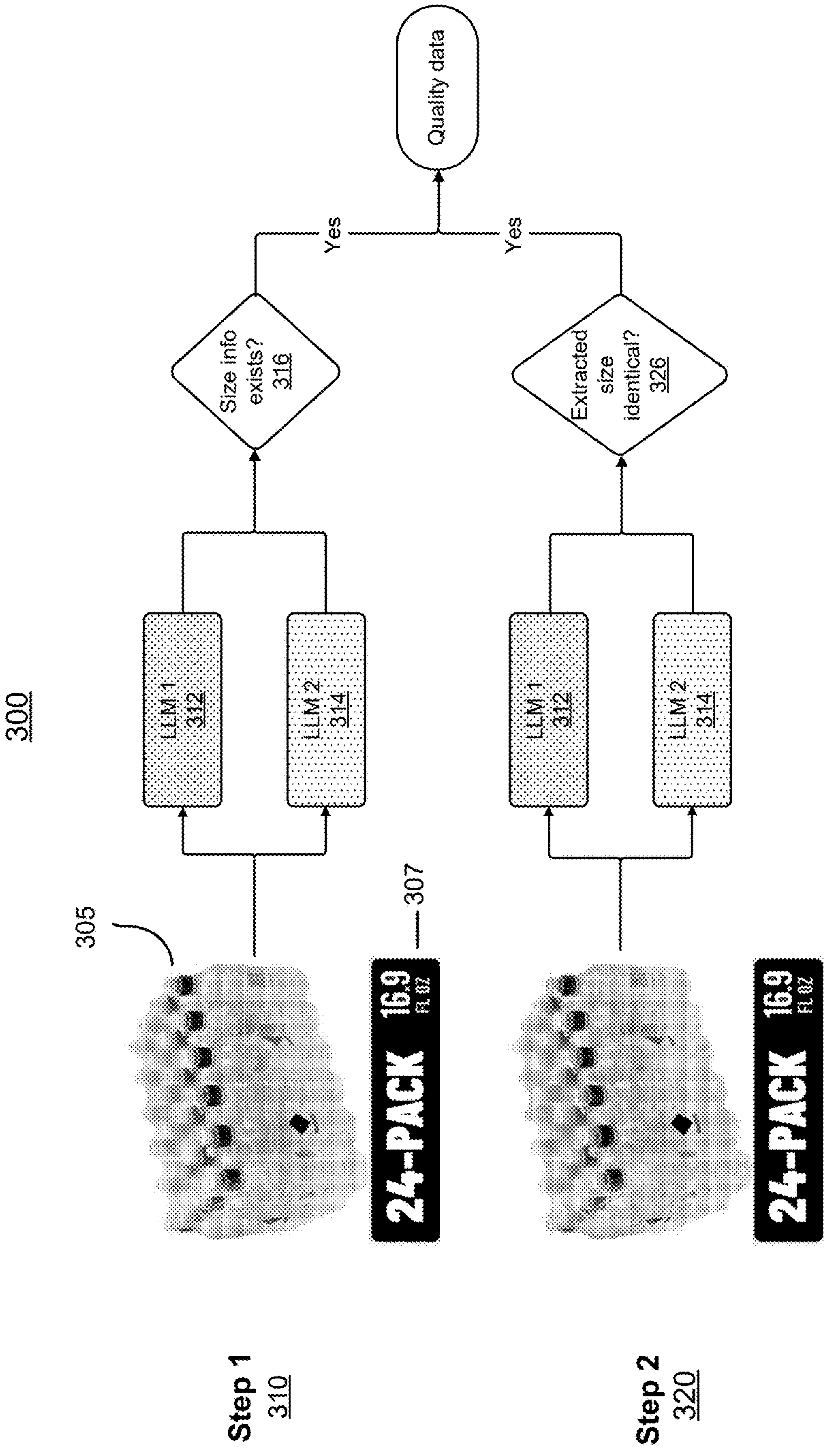
FIG. 3 is an example of a process of applying the ensemble model to extract attribute values, in accordance with one or more embodiments.

FIG. 3 is an example of a process of applying the ensemble model to extract attribute values, in accordance with one or more embodiments. In the example of FIG. 3, the ensemble model includes at least a first LLM 1 312 and a second LLM 2 314. Each LLM may be a multi-modal model that is coupled to receive data of one or more modalities and generate outputs of one or more modalities (e.g., text, image, video, audio). In one or more embodiments, the LLM 1 and LLM 2 may have different architecture, different parameters, or different sizes. For example, LLM 1 312 may be associated with 48 transformer blocks, while LLM 2 314 may be associated with 30 transformer blocks. The ensemble model receives an image of an item 305 as the item description for a 24-pack of water bottles. The image 305 includes a size and count attribute description 307.

The attribute extraction module 225 obtains an image of an item in a database. The attribute extraction module 225 may obtain an image of an item. The attribute extraction module 225 may receive an image from a database of a retailer or a third party database. The image may include text specifications of the item. The text specifications describe a size or count attribute of the item in the image. As an example, FIG. 3 includes an image of an item with a size and count attribute description 307 for a water bottle pack 305 item. The size and count information is "24 pack, 16.9 fl oz" to describe the count of the item and the size of the item.

At step 1 310, the attribute extraction module 225 prompts a set of machine-learned models to confirm if a size or count attribute exists for an image. The attribute extraction module 225 prompts a set of machine-learned models with a first set of prompts. The prompt includes an image of an item and a request to determine if an attribute value of the item is in the image. For example, in FIG. 3, a prompt to LLM 1 312 includes the image of the water bottle item 305 including the size and count attribute description 307 with the instruction "Given the image, does information of the item's size or quantity exist?" A similar prompt can be provided to LLM 2 314. The attribute extraction module 225 then receives a set of outputs from each LLM of the ensemble of LLMs. The outputs from the ensemble determine whether size information is present in the image.

The attribute extraction module 225 determines 316 whether a threshold number of outputs indicate that the attribute information is present in the image. A threshold number of outputs is a set number of LLM outputs with a matching confirmation that size information exists in the image. The matching confirmation can be, for example, 80% of the ensemble of LLMs agree, or 100% of the ensemble of LLMs agree. In one or more embodiments, when the determination 316 indicates the size information does not exist, the attribute extraction module 225 may provide this information to the requestor so that a separate verification process by, for example, a human operator can be performed to confirm the attributes.

Responsive to confirming that size information is present in the image, at step 2 320, the attribute extraction module 225 prompts the ensemble of LLMs with a second set of prompts to extract the confirmed size or count values of the item. The prompt includes an image of an item and a request to extract the determined size or count information of the item in the image. The attribute extraction module 225 prompts a set of LLMs with a second set of prompts. The prompt includes an image of an item and a request to determine the size information of the item in the image. For example, in FIG. 3, a prompt to LLM 1 312 includes the image of the water bottle pack item 305 including the size and count attribute description 307 with the instruction to "Given the image, extract the information of the item's size and quantity." A similar prompt can be provided to LLM 2 314.

The attribute extraction module 225 receives a set of outputs from the ensemble of LLMs of a second set of outputs with extracted values of size information of the item in the image. The outputs from the ensemble determine the size or count information in the image. For example, in FIG. 3, an output from the LLM 1 312 includes the extracted attribute values, and a response "Given the image, the textual information of the item size or quantity is 24 packs, 6.9 fl oz".

Responsive to determining 326 that a threshold number of outputs have a matching value of the size or count information that is present in the image, the attribute extraction module 225 updates the item attribute data with the matching values of size information of the item. A threshold number of outputs is a set percentage of a number of LLMs with a matching value of size information. In response, the attribute extraction module 225 automatically updates a catalog or a taxonomy for the item associated with the item to update the size information and quantity information of the item. In one or more embodiments, the attribute extraction module 225 performs a normalization step after receiving the responses from the LLMs that corrects the received responses to fit the standards of the catalog. As an example, an output extracted from the ensemble process would be "2.0 fluid ounces" for the volume of an item. If the catalog uses the abbreviation "fl oz," the attribute extraction module 225 further converts the output to "2 fl oz" and updates the catalog. In one or more embodiments, depending on the locale of the item, the attribute extraction module 225 selects or converts to the Imperial or metric system. For example, for items in Canada, the metric system is used, but for items in the United States, the Imperial metric system is used. In one or more embodiments, when the determination 326 indicates the size information does not match, the attribute extraction module 225 may provide this information to the requestor so that a separate verification process by, for example, a human operator can be performed to confirm the attributes.

In essence, our ensemble methods combine the predictions of multiple, diverse models. These models often have different strengths due to variations in their construction and training processes. By only utilizing predictions where models agree, ensemble methods essentially create a cross-validation system that minimizes incorrect predictions (hallucinations). Employing a two-step process rather than a single extraction step adds an extra safeguard, further reducing errors and improving overall performance.

Fine-Tuning Process for LLM

In one or more embodiments, the attribute extraction module 225 can further fine-tune parameters of the machine-learned models using a training set including a set of training instances. A training instance includes inputs comprising the image (or other descriptions) of the item and expected outputs comprising the indication of whether an image includes size or count values of the item, or inputs including the image of the item and expected outputs including the extracted size or count information of the item.

In one or more embodiments, a first training data instance may include a prompt and labels indicating a confirmation of whether attribute values are present in the image. For example, a prompt may include an image (e.g., image of a item 305 in FIG. 3) including attribute description (e.g., image of a item 305 in FIG. 3), and a prompt to instruct the LLM to identify whether attribute values of the item exists in the description. The label is the confirmation of whether the attribute value exists in the description of the item. For example, the label may be 1 if it exists, 0 otherwise.

In one or more embodiments, a second training data instance may include a prompt and labels indicating one or more extracted attribute values. For example, a prompt may include an image (e.g., image of an item 305 in FIG. 3) including attribute descriptions, and a prompt to extract the values of the desired attributes from the image. The label is the extracted attribute values of the item which have already been verified to be correct.

The attribute extraction module 225 encodes the data into a set of input tokens, in which a token is a numerical vector representing a word, sub-word, phrase, pixels, latent pixels, in a latent space. When the transformer architecture of the machine-learned model (e.g., LLM) is of an autoregressive architecture, the LLM may be applied to the prompts of the training data to generate one or more output tokens. An output token is decoded to determine a probability that the decoded token corresponds to a corresponding token in the label.

The attribute extraction module 225 determines a loss function across the one or more output tokens that indicates a difference (e.g., logit difference) between tokens in the label and the output tokens generated by the forward pass of the transformer model. As an example, the loss function may be an NLP loss for each token combined across one or more output tokens generated for the label. The attribute extraction module 225 obtains one or more error terms from the loss function and performs backpropagation to update parameters of the transformer architecture.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

Figure 4:
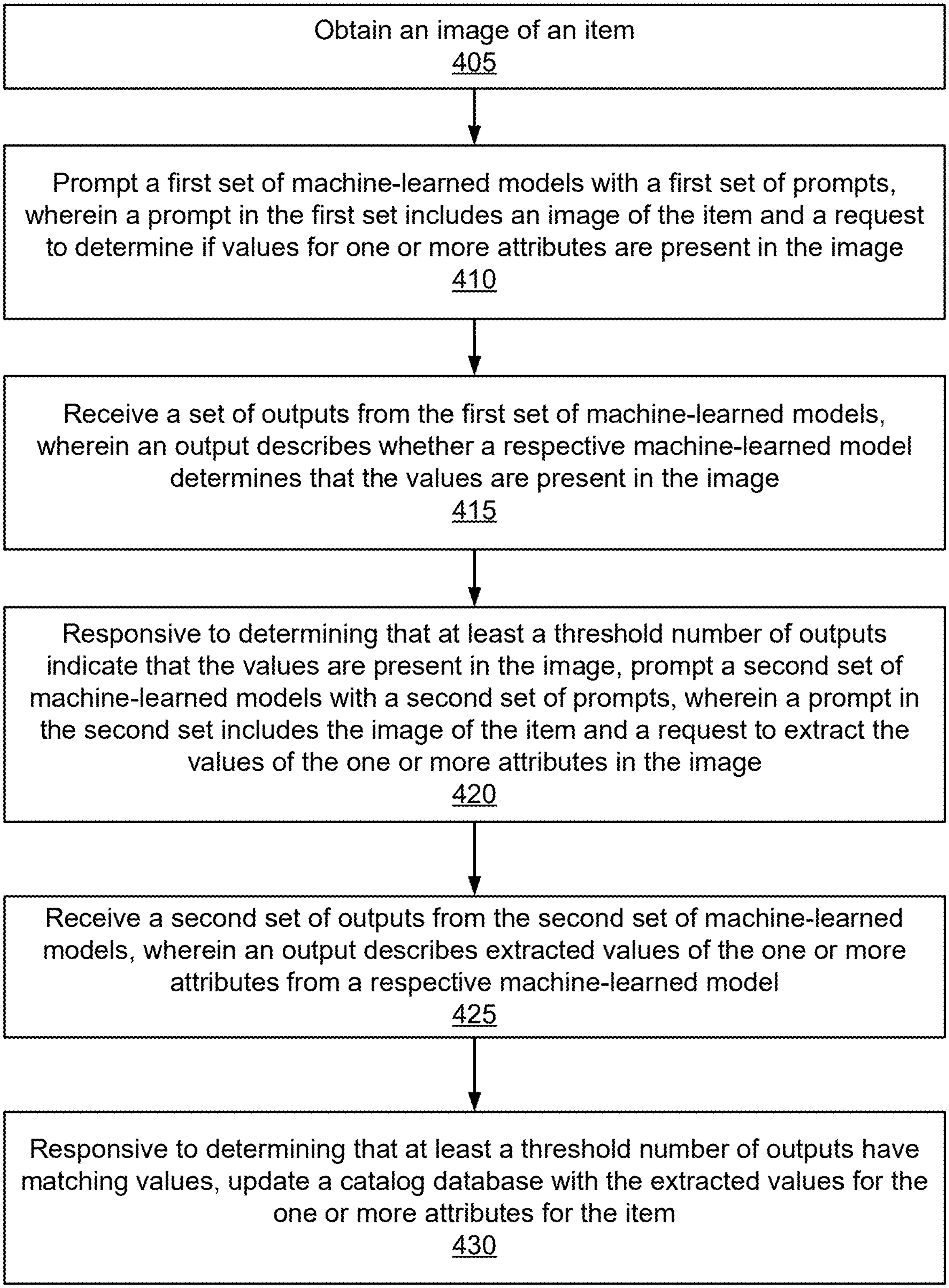
FIG. 4 is a flowchart for an attribute extraction module, in accordance with one or more embodiments.

FIG. 4 is a flowchart for a method of an attribute extraction module 225 in accordance with some embodiments. Alternative embodiments may include more, fewer, or different steps from those illustrated in FIG. 4, and the steps may be performed in a different order from that illustrated in FIG. 4. These steps may be performed by an online system (e.g., online system 140). Additionally, each of these steps may be performed automatically by the online system without human intervention. An attribute extraction module obtains 405 an image of an item. The module prompts 410 a first set of machine-learned models with a first set of prompts, wherein a prompt in the first set includes an image of the item and a request to determine if values for one or more attributes are present in the image. The module receives 415 a set of outputs from the first set of machine-learned models, wherein an output describes whether a respective machine-learned model determines that the values are present in the image. Responsive to determining that a threshold number of outputs indicate that the values are present in the image, the module prompts 420 a second set of machine-learned models with a second set of prompts, wherein a prompt in the second set includes the image of the item and a request to extract the values of the one or more attributes in the image. The module receives 425 a second set of outputs from the second set of machine-learned models, wherein an output describes extracted values of the one or more attributes from a respective machine-learned model. Responsive to determining that a threshold number of outputs have matching values present in the image, the module updates 430 a catalog database with the extracted values for the one or more attributes for the item.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, comprising:

obtaining an image of an item;

prompting a first set of machine-learned models with a first set of prompts, wherein a prompt in the first set includes an image of the item and a request to determine if values for one or more attributes are present in the image;

providing the first set of prompts to a model serving system deployed with the first set of machine-learned models for execution, wherein the first set of machine-learned models are each configured as a respective transformer architecture including one or more attention layers, and wherein the first set of machine-learned models have different sets of parameters or architectures from one another;

encoding input data from the first set of prompts as a first set of input tokens, wherein the first set of input tokens are encoded as input embeddings in latent space;

applying parameters of the first set of machine-learned models to the first set of input tokens to generate a set of output tokens, wherein output tokens for a machine-learned model is obtained by sequentially applying the transformer blocks of the machine-learned model;

receiving the set of output tokens from the first set of machine-learned models, wherein the set of output tokens describes whether a respective machine-learned model determines that the values are present in the image;

responsive to identifying that at least a threshold number of outputs indicate that the values are present in the image, prompting a second set of machine-learned models with a second set of prompts, wherein a prompt in the second set includes the image of the item and a request to extract the values of the one or more attributes in the image;

providing the second set of prompts to the model serving system deployed with the second set of machine-learned models for execution, wherein the second set of machine-learned models are each configured as a respective transformer architecture including one or more attention layers, and wherein the second set of machine-learned models have different sets of parameters or architectures from one another;

encoding input data from the second set of prompts as a second set of input tokens using the model serving system, wherein the second set of input tokens are encoded as input embeddings in latent space;

applying parameters of the second set of machine-learned models to the second set of input tokens to generate a second set of output tokens;

receiving a second set of outputs from the second set of machine-learned models, wherein an output describes extracted values of the one or more attributes from a respective machine-learned model; and responsive to identifying that at least a threshold number of outputs have matching values, updating a catalog database with the extracted values for the one or more attributes for the item.

2. The method of claim 1, wherein the one or more attributes include one or more of: a quantity of a number of units in the item, a volume associated with the item, or a weight associated with the item.

3. The method of claim 1, wherein the image is from a third-party source or a retailer.

4. The method of claim 1, further comprising updating a taxonomy data structure with the extracted values of the one or more attributes of the item.

5. The method of claim 1, further comprising:

generating a first training dataset including a set of data instances, wherein a data instance includes inputs comprising the image of another item and expected outputs comprising whether the image of another item includes values for the one or more attributes; and fine-tuning parameters of a machine-learned model using the first training dataset.

6. The method of claim 1, further comprising:

generating a second training dataset including a set of data instances, wherein a data instance includes inputs comprising the image of another item and expected outputs comprising the extracted values of the another item; and fine-tuning parameters of a machine-learned model using the second training dataset.

7. The method of claim 1, wherein each of the first set of machine-learned models and the second set of machine-learned models include a same set of machine-learned models.

8. The method of claim 1, responsive to identifying that the outputs from the first set of machine-learned models indicate that the values are not present in the image or responsive to identifying that the outputs from the second set of machine-learned models indicate that the extracted values do not match, presenting a message indicating the one or more attributes cannot be extracted from the image.

9. A non-transitory computer-readable storage medium storing instructions that when executed by a computer processor cause the computer processor to perform steps comprising:

obtaining an image of an item;

prompting a first set of machine-learned models with a first set of prompts, wherein a prompt in the first set includes an image of the item and a request to determine if values for one or more attributes are present in the image;

providing the first set of prompts to a model serving system deployed with the first set of machine-learned models for execution, wherein the first set of machine-learned models are each configured as a respective transformer architecture including one or more attention layers, and wherein the first set of machine-learned models have different sets of parameters or architectures from one another;

encoding input data from the first set of prompts as a first set of input tokens, wherein the first set of input tokens are encoded as input embeddings in latent space;

applying parameters of the first set of machine-learned models to the first set of input tokens to generate a set of output tokens, wherein output tokens for the machine-learned model are obtained by sequentially applying the transformer blocks of the first machine-learned model;

receiving the set of output tokens from the first set of machine-learned models, wherein the set of output tokens describes whether a respective machine-learned model determines that the values are present in the image;

responsive to identifying that at least a threshold number of outputs indicate that the values are present in the image, prompting a second set of machine-learned models with a second set of prompts, wherein a prompt in the second set includes the image of the item and a request to extract the values of the one or more attributes in the image;

providing the second set of prompts to the model serving system deployed with the second set of machine-learned models for execution, wherein the second set of machine-learned models are each configured as a respective transformer architecture including one or more attention layers, and wherein the second set of machine-learned models have different sets of parameters or architectures from one another;

encoding input data from the second set of prompts as a second set of input tokens using the model serving system, wherein the second set of input tokens are encoded as input embeddings in latent space;

applying parameters of the second set of machine-learned models to the second set of input tokens to generate a second set of output tokens;

receiving a second set of outputs from the second set of machine-learned models, wherein an output describes extracted values of the one or more attributes from a respective machine-learned model; and responsive to identifying that at least a threshold number of outputs have matching values, updating a catalog database with the extracted values for the one or more attributes for the item.

10. The non-transitory computer-readable storage medium of claim 9, wherein the one or more attributes include one or more of: a quantity of a number of units in the item, a volume associated with the item, or a weight associated with the item.

11. The non-transitory computer-readable storage medium of claim 9, wherein the image is from a third-party source or a retailer.

12. The non-transitory computer-readable storage medium of claim 9, further comprising updating a taxonomy data structure with the extracted values of the one or more attributes of the item.

13. The non-transitory computer-readable storage medium of claim 9, further comprising:

generating a first training dataset including a set of data instances, wherein a data instance includes inputs comprising the image of another item and expected outputs comprising whether the image of another item includes values for the one or more attributes; and fine-tuning parameters of a machine-learned model using the first training dataset.

14. The non-transitory computer-readable storage medium of claim 9, further comprising:

generating a second training dataset including a set of data instances, wherein a data instance includes inputs comprising the image of another item and expected outputs comprising the extracted values of another item; and fine-tuning parameters of a machine-learned model using the second training dataset.

15. The non-transitory computer-readable storage medium of claim 9, wherein each of the first set of machine-learned models and the second set of machine-learned models include a same set of machine-learned models.

16. The non-transitory computer-readable storage medium of claim 9, responsive to identifying that the outputs from the first set of machine-learned models indicate that the values are not present in the image or responsive to identifying that the outputs from the second set of machine-learned models indicate that the extracted values do not match, presenting a message indicating the one or more attributes cannot be extracted from the image.

17. A computer system, the computer system comprising:

a computer processor; and a non-transitory computer-readable storage medium storing instructions that when executed by a computer processor cause the computer processor to perform steps comprising:

obtaining an image of an item;

prompting a first set of machine-learned models with a first set of prompts, wherein a prompt in the first set includes an image of the item and a request to determine if values for one or more attributes are present in the image;

providing the first set of prompts to a model serving system deployed with the first set of machine-learned models for execution, wherein the first set of machine-learned models are each configured as a respective transformer architecture including one or more attention layers, and wherein the first set of machine-learned models have different sets of parameters or architectures from one another;

encoding input data from the first set of prompts as a first set of input tokens, wherein the first set of input tokens are encoded as input embeddings in latent space;

applying parameters of the first set of machine-learned models to the first set of input tokens to generate a set of output tokens, wherein output tokens for the machine-learned model are obtained by sequentially applying the transformer blocks of the first machine-learned model;

receiving the set of output tokens from the first set of machine-learned models, wherein the set of output tokens describes whether a respective machine-learned model determines that the values are present in the image;

responsive to identifying that at least a threshold number of outputs indicate that the values are present in the image, prompting a second set of machine-learned models with a second set of prompts, wherein a prompt in the second set includes the image of the item and a request to extract the values of the one or more attributes in the image;

providing the second set of prompts to the model serving system deployed with the second set of machine-learned models for execution, wherein the second set of machine-learned models are each configured as a respective transformer architecture including one or more attention layers, and wherein the second set of machine-learned models have different sets of parameters or architectures from one another;

encoding input data from the second set of prompts as a second set of input tokens using the model serving system, wherein the second set of input tokens are encoded as input embeddings in latent space;

applying parameters of the second set of machine-learned models to the second set of input tokens to generate a second set of output tokens;

receiving a second set of outputs from the second set of machine-learned models, wherein an output describes extracted values of the one or more attributes from a respective machine-learned model; and responsive to identifying that at least a threshold number of outputs have matching values, updating a catalog database with the extracted values for the one or more attributes for the item.

18. The computer system of claim 17, wherein the one or more attributes include one or more of: a quantity of a number of units in the item, a volume associated with the item, or a weight associated with the item.

19. The computer system of claim 17, wherein each of the first set of machine-learned models and the second set of machine-learned models include a same set of machine-learned models.

* * * * *